Oct. 26, 1926.

C. E. WEBSTER 1,604,430

WATER HEATING APPARATUS

Filed April 9, 1925

INVENTOR:
Charles E. Webster
by Ralph Donath and
Paul Purchard,
Attorneys.

Patented Oct. 26, 1926.

UNITED STATES PATENT OFFICE.

CHARLES E. WEBSTER, OF WELLSVILLE, OHIO.

WATER-HEATING APPARATUS.

Application filed April 9, 1925. Serial No. 21,885.

This invention relates to water heating apparatus and more in particular to water heating storage tanks for household purposes.

One of the principal objects of this invention is to provide a water heating storage tank having a centrally located heating element reaching within the water to be heated for the purpose of reducing the loss of heat by radiation. Another object is to provide a heating tank having a heating element which can be easily removed for the purpose of cleaning or repairing. A further object is to provide a water heating tank in which the incoming water is caused to come in close contact with the heated sides of the heating element before accumulating in the tank. A still further object is to devise a water heating tank which is simple in construction, economical and which can be manufactured at relatively low cost. Additional features and advantages of this invention may appear from the following description, considered in connection with the accompanying drawing forming a part of this application.

Figure 2:
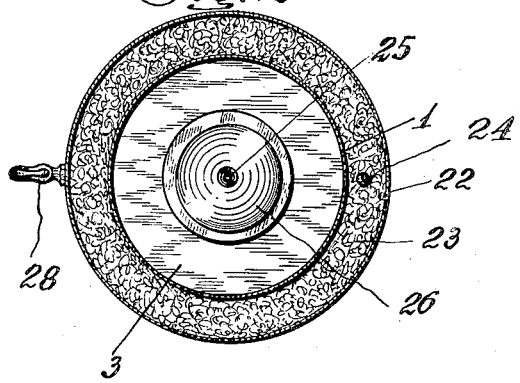
Fig. 2 is a section taken substantially on line 2—2 in Fig. 1.
Figure 1:
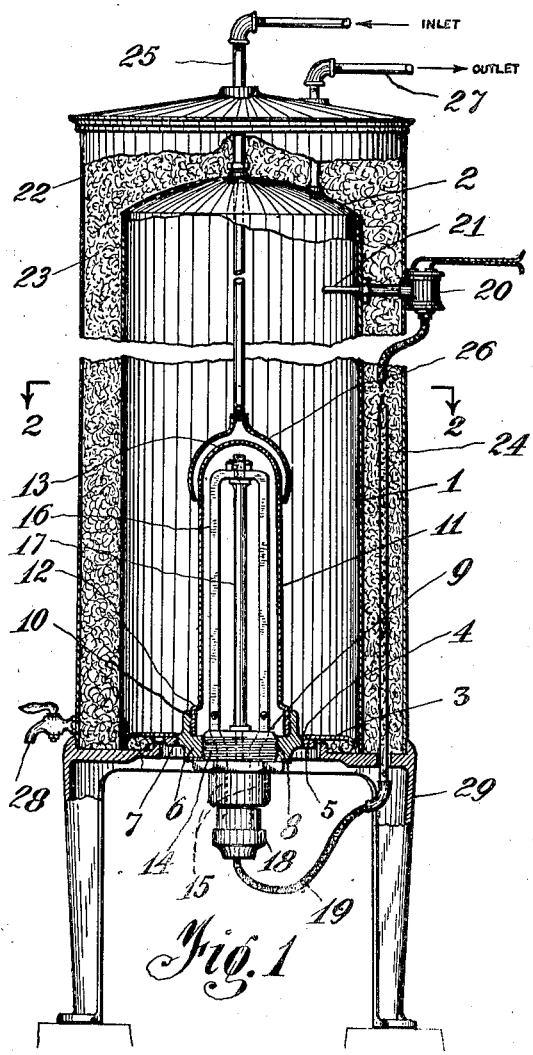
Fig. 1 is a side elevation mostly in section, showing my water heating tank provided with an electric heating element which forms the subject matter of a copending application for Letters Patent of the United States.

Referring more in particular to Figs. 1 and 2, my water heating apparatus comprises a water storage tank 1 having an integral top or cover 2 and a bottom 3. The latter is provided with a central aperture 4 which is strengthened and thickened by means of a circular flange 5 which is secured thereon in any desired manner, but preferably by welding. This flange is internally threaded to receive the central bushing 6 having a circular collar 7 upon which is cut an external thread engaging said flange. This bushing is centrally bored and tapped to two diameters; the outer bore 8 being adapted to secure the electric heating element 9 and the inner bore 10 serving to secure what I call the metallic hot-tube 11 the purpose of which is to separate the electric heating element from the water stored in the tank 1. This hot tube is preferably made by the so-called spinning process and is provided at the bottom with an enlargement 12 in which a screw-thread is cut to fit tightly with the inner bore of the bushing. The top 13 of the hot-tube is closed and of semispherical shape.

The principal parts of the electrical heating element are the threaded plug 14, fitting within the outer bore of the bushing 6, the electrical leads 15, the heating element 16, the supporting post 17 for the latter and the electrical jack-plug 18 at the end of the cable 19, by means of which the heating element is connected to a source of electrical energy. The automatic operation of this electric heating element is effected by means of a thermostatic device of any desired and suitable type indicated in the Fig. 1 by the numeral 20. As shown therein, this thermostat has a tube 21 reaching well within the body of water in the tank; the object of said thermostat being to close the electrical circuit to the heating element when the temperature of the water, at the tube 21 reaches a certain low mark and to open said circuit when the water has attained a pre-determined maximum temperature. To reduce the losses of heat by radiation, the storage tank is preferably enclosed in an outer casing 22 and surrounded by an ample layer of insulating material 23. The cable 19 leading from the jack-plug to the thermostat is preferably passed through a conduit 24 imbedded in said insulating material.

The storage tank is supplied with fresh water by means of a centrally located pipe 25 entering the tank through the top thereof and leading down to within a short distance of the top of the hot-tube 11. The lower end of said supply pipe is threaded to securely and adjustably hold the bell-member 26, substantially semi-spherical in form and dimensioned to closely surround the rounded top of the hot-tube. It will be noted that by means of this bell-member, the entering cold water is distributed over the hottest part of the hot-tube in a rather thin stream, thus absorbing a great amount of heat before mixing with the water in the storage tank. The thickness of said stream may be varied by screwing said bell more or less on said supply pipe also, a more perfect and all-around forced circulation in the stored water will be effected than could be obtained, were the fresh water to enter the tank by simply running out of the end of a plain pipe. The hot water is drawn from the storage tank, through the outlet pipe 27.

A drain cock 28 is also provided to facilitate the periodical draining of the tank prior to removing the heating element for the purpose of removing whatever scale or sediment may have settled on the heating tube. It will be observed, however, that owing to the rapid flow of the incoming cold water all around the hot-tube, such formation of scale thereon will be greatly retarded, if not entirely eliminated.

The hot water storage tank is usually mounted on a base 29 of suitable height to permit of the easy removal of the complete heating element without requiring the raising of the tank proper.

It is thought that the utility of my invention will be apparent without further description, and while in the drawing there is illustrated a preferred embodiment of the same, it is to be understood that the structural elements are susceptible to such changes as fall within the scope of the appended claims.

I claim:—

1. In a hot water storage tank, a heating element positioned centrally in the bottom of said tank and immersed in the water in said tank; said heating element comprising a metallic hot-tube having a substantially semi-spherical closed top and an open base secured to the bottom of said tank; a heat generator adapted to operate within said hot-tube and heat the same; a water supply pipe; a substantially semi-spherical bell-member positioned at the discharge end of said supply pipe and surrounding the top of said hot-tube, and means to vary the distance between said bell-member and said hot-tube.

2. In a hot water storage tank, a heating element positioned centrally in the bottom of said tank and immersed in the water in said tank; said heating element comprising a metallic hot-tube having a substantially semi-spherical closed top and an open base secured to the bottom of said tank; a heat generator adapted to operate within said hot-tube and heat the same; a water supply pipe reaching within a short distance of the top of said hot-tube and coaxially disposed thereto, the lower portion of this pipe being threaded; a substantially semi-spherical bell-member positioned at the discharge end of said supply pipe and having a threaded central aperture adapted to engage the threads on the lower portion of said supply pipe, said pipe-threads being of sufficient length to permit varying the distance between said bell-member and said hot-tube.

In testimony whereof I affix my signature.

CHARLES E. WEBSTER.